United States Patent
Agrawal et al.

(10) Patent No.: US 8,799,399 B2
(45) Date of Patent: Aug. 5, 2014

(54) NEAR-REAL TIME DISTRIBUTED USAGE AGGREGATION SYSTEM

(75) Inventors: Pragya Agrawal, Andhra Pradesh (IN); Jagan Peri, Hyderabad (IN); Vipindeep Vangala, Andhra Pradesh (IN); Jatin Kakkar, Hyderabad (IN); Vijay Amrit Agrawal, Hyderabad (IN); Rohit Kapoor, Uttar Pradesh (IN)

(73) Assignee: Microsoft Corporation, Redmond, WA (US)

( * ) Notice: Subject to any disclaimer, the term of this patent is extended or adjusted under 35 U.S.C. 154(b) by 159 days.

(21) Appl. No.: 13/531,849

(22) Filed: Jun. 25, 2012

(65) Prior Publication Data

US 2013/0346533 A1 Dec. 26, 2013

(51) Int. Cl.
*G06F 15/167* (2006.01)
*H04L 12/24* (2006.01)
*H04L 29/08* (2006.01)

(52) U.S. Cl.
CPC ............ *H04L 41/08* (2013.01); *H04L 29/0854* (2013.01); *H04L 41/0813* (2013.01); *H04L 41/082* (2013.01); *H04L 41/0846* (2013.01); *H04L 41/0853* (2013.01)
USPC ........... 709/214; 709/203; 709/216; 709/217; 709/223; 709/248

(58) Field of Classification Search
USPC ................... 709/203, 214, 216, 217, 226, 248
See application file for complete search history.

(56) References Cited

U.S. PATENT DOCUMENTS

| | | | |
|---|---|---|---|
| 7,069,161 B2 | 6/2006 | Gristina et al. | |
| 7,107,409 B2 * | 9/2006 | Glasco | 711/141 |
| 8,089,987 B2 * | 1/2012 | Spicer et al. | 370/469 |
| 2003/0046396 A1 | 3/2003 | Richter et al. | |
| 2009/0144388 A1 * | 6/2009 | Gross et al. | 709/213 |
| 2009/0319905 A1 | 12/2009 | Loeb et al. | |
| 2010/0100952 A1 * | 4/2010 | Sample et al. | 726/9 |
| 2010/0131624 A1 | 5/2010 | Ferris | |
| 2011/0271007 A1 * | 11/2011 | Wang et al. | 709/238 |
| 2011/0295727 A1 | 12/2011 | Ferris | |
| 2011/0296000 A1 | 12/2011 | Ferris | |

OTHER PUBLICATIONS

Shen, et al., "CloudScale: Elastic Resource Scaling for Multi-tenant Cloud Systems", In Proceedings of 2nd ACM Symposium on Cloud Computing, Oct. 27-28, 2011, 14 pages.
Forell, et al., "Cloud Management: Challenges and Opportunities", in Proceedings of IEEE International Symposium Parallel & Distributed Processing Symposium, May 16-20, 2011, pp. 881-889.

* cited by examiner

*Primary Examiner* — Michael Y Won
(74) *Attorney, Agent, or Firm* — Ben Tabor; David Andrews; Micky Minhas

(57) ABSTRACT

Gathering tenant usage data of server resources. A method includes a server in a cluster providing server resources for one or more tenants of the server. Data is stored in a local usage cache at the server. The data characterizes the resources provided to the one or more tenants of the server. At the server, data stored in the local usage cache is aggregated on a tenant basis, such that data is aggregated for given tenants. The aggregated data is sent to a distributed cache. At the server, aggregated data from other servers in the cluster is received from the distributed cache. The aggregated data from other servers in the cluster is globally aggregated and stored at an aggregated usage cache at the server in the globally aggregated form.

20 Claims, 3 Drawing Sheets

NEAR-REAL TIME DISTRIBUTED USAGE AGGREGATION SYSTEM

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections.

The connections allow a computing system to access services at other computing systems and to quickly and efficiently receive application data from other computing systems. Further, interconnected computing systems can be used to implement cluster computing systems where several discrete systems work together to accomplish a computing task assigned to the cluster as a whole. Some such systems may have all, or a portion of the cluster deployed in the cloud. Cloud computing allows for computing resources to be provided as services rather than a deliverable product. In particular, computing power, software, information, etc. are provided (for example, through a rental agreement) over a network, such as the Internet.

Cluster computing systems can implement a multi-tenant service which allows multiple different tenants to tenant cluster computing resources. A multi-tenant service running in the cloud may need to address issues related to fair usage and guarantees for all tenants. In particular, a tenant should not be allowed to use more than what they have paid for, and all tenants should be isolated from disproportionate use of resources made by another tenant in the same cluster.

Previously, a centralized aggregation database collected usage data from various different servers and then ran a script periodically on the data to determine if a tenant had exceeded their limits. The centralized aggregation database would then enforce limits based on reported usage. However, time delays between running of the script and enforcement message messaging delays resulted in limit enforcements occurring in a significantly delayed manner.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method practiced in a computing environment including acts for gathering tenant usage data of server resources. The method includes a server in a cluster providing server resources for one or more tenants of the server. Data is stored in a local usage cache at the server. The data characterizes the resources provided to the one or more tenants of the server. At the server, data stored in the local usage cache is aggregated on a tenant basis, such that data is aggregated for given tenants. The aggregated data is sent to a distributed cache. At the server, the aggregated data from other servers is received from the distributed cache. The aggregated data from the other servers is aggregated again to get a cluster-wide view of usage. This doubly aggregated data is cached in the aggregated usage cache at the server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein are able to implement a usage system that aggregates and/or enforces resource usage information across different machines (sometimes referred to herein as nodes) in a cluster in near real time, while maintaining consistency of the usage data across node failures. This may be accomplished by implementing raw data local caches at local machines to store raw usage information describing how machine resources are used by different tenants. The local machine can aggregate usage information at a tenant level where the aggregated information shows what tenants are using what resources. This first level of aggregation helps to reduce the latency of operations. The aggregated information at each machine can be sent by the individual machines to a global distributed usage cache, that is itself a partitioned cache in the cluster. Locally, each node can include a second local cache of aggregated data to reduce latency. The local aggregated cache includes an aggregation of a tenant's (sometimes referred to herein as users) usage information across nodes in the cluster. This aggregation can be done in near real time so that a tenant can be throttled as soon as the tenant exceeds its limits.

Aggregated usage data can, alternatively or additionally, be useful for monitoring consumption of resources, both for internal capacity planning by the service provider, and for displaying consumption pattern to the end user. It may additionally or alternatively be useful for billing based on a user's or tenant's consumption.

Some embodiments described herein include a usage system that can aggregate usage information in near real time across a cluster with low impact on performance of the service as a whole. Embodiments may include the ability to compute near real time usage data across nodes in a cluster for a multi-tenant service. Embodiments may include functionality that is able to reduce network traffic and latency overhead by local caching and aggregation of usage data. Embodiments may include functionality for maintaining consistency of usage data in the face of node failures and partition movements.

Figure 1:
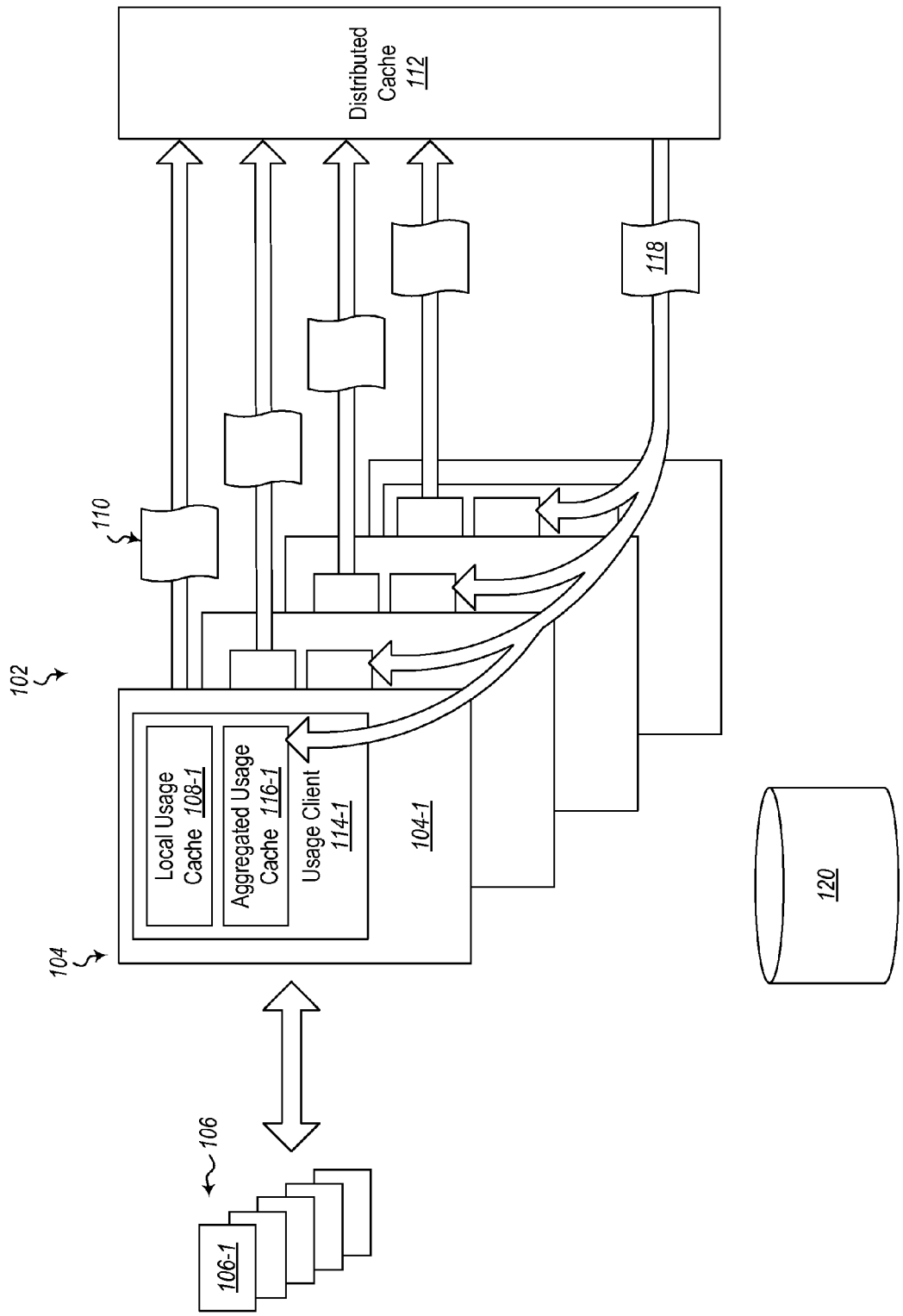
FIG. 1 illustrates a cluster environment and a distributed cache for collecting and storing resource usage information.

Referring now to FIG. 1, an example is illustrated. FIG. 1 illustrates a cluster 102. The cluster 102 includes a set 104 of servers. While four servers are illustrated in the set 104 of servers, it should be appreciated that virtually any plurality of servers could be used.

A set 106 of tenants access services provided by the servers in the set 104 of servers. Such services may include, but are not limited to, sending and receiving email, hosing e-commerce sites, hosting multimedia sites, hosting enterprise data centers, etc. In a cluster computing environment, different tenants from the set of tenants 106 can use different servers from the set of servers 104. Often, a tenant 106-1 will submit a job to be completed which will then be assigned to one of the servers in the set 104 of servers according to some overarching scheduling policy. Thus, several of the servers in the set 104 of servers will provide services for a single tenant 106-1. Thus, each server in the set 104 of servers may have data related to how particular tenants use services on that server.

In the example illustrated, usage data lives in three classes of places during the process of collection and aggregation. First, usage data, that is data describing how services or resources of a server are used by one or more tenants, is stored in a local usage cache. FIG. 1 illustrates a local usage cache 108-1 (local usage caches are referred to herein generically as 108) for a server 104-1. Each server in the set 104 of servers includes a local usage cache 108. The local usage cache 108 stores usage data generated locally on each cache host and gateway (e.g. each server). When a usage event is generated, it is aggregated locally and cached as local data in the local usage cache 108. Such usage events may be generated when resources are used by a tenant on a server. For example, if a tenant uses server resources on the server 104-1, such resource usage will be recorded in the local usage cache 108-1. If a tenant uses resources on a different server, that usage will be recorded in the local usage cache 108 of that server.

Secondly, periodically local data is sent to a global un-aggregated data storage. For example, FIG. 1 illustrates data 110 being sent from the local usage storage cache on each server in the set 104 of servers to a distributed cache 112. The distributed cache 112 stores usage data for all tenants in the set 106 of tenants and all servers in the set 104 of servers. Although the distributed cache 112 contains data from all nodes in the cache ring, the data is un-aggregated across nodes. The distributed cache may be used exclusively by a usage client (such as usage client 114-1) which runs on each node in the cluster. In the case where a cluster implements a cache service, usage clients may run on both gateways and hosts.

For a cache service, instead of creating a separate usage ring, embodiments use a 'system cache' in the existing cache ring. Therefore, partitions of this system cache share the cache host with partitions of other tenant created caches. The system cache should not be visible to external tenants. The cache is non-evictable, non-expirable, and preferably, has failover support.

The third class of places where usage data is stored is in aggregated usage caches. An example aggregated usage cache 116-1 (aggregated usage caches are referred to generically as 116 herein) is illustrated as part of the usage client 114-1 of the server 104-1. The aggregated usage cache stores an aggregation of usage data generated over the distributed cluster 102, but cached locally at a usage client on each server in the cluster 102. Aggregated usage cache data lives on each cache host (e.g. each usage client and/or server) and each gateway. A gateway is a set of nodes that are responsible for validating a request before sending it to the cache cluster. A user request first lands on the gateway. The gateway checks whether the request is valid, whether the user has exceeded his quota or not, and if everything is valid, it then forwards the request to the cache cluster. In some implementations, each cache node is also gateway, but it need not be so. The aggregated usage cache 116 is periodically refreshed by receiving data 118 (such as through either a push or a pull) from the distributed cache 112 and aggregating the data. In some embodiments, the data may be aggregated by the distributed cache 112 and sent to the individual servers in the set 104 of servers, or it may be sent as raw un-aggregated data to each of the servers in the set 104 of servers and aggregated at each server.

The frequency with which data of a particular resource is sent from a local usage cache (such as cache 108-1) to the distributed cache 112 and the frequency with which aggregated data is refreshed and recomputed may be implemented as configurable parameters. Alternatively or additionally, some embodiments may allow a resource to be configured for local aggregation only. For example, some embodiments may facilitate aggregating some resource usage globally by sending resource usage information to the distributed caches, while other resource usage information is aggregated only locally in the aggregated usage cache 116.

Usage data can be persisted to an offline store 120. Persistence providers are pluggable and the choice and configuration of the persistent store as well as the frequency of persistence are configurable. Offline storage may be used to run reports that can be used, for example, to monitor the service and consumption of resources and for billing customers based on resource usage.

Figure 2:
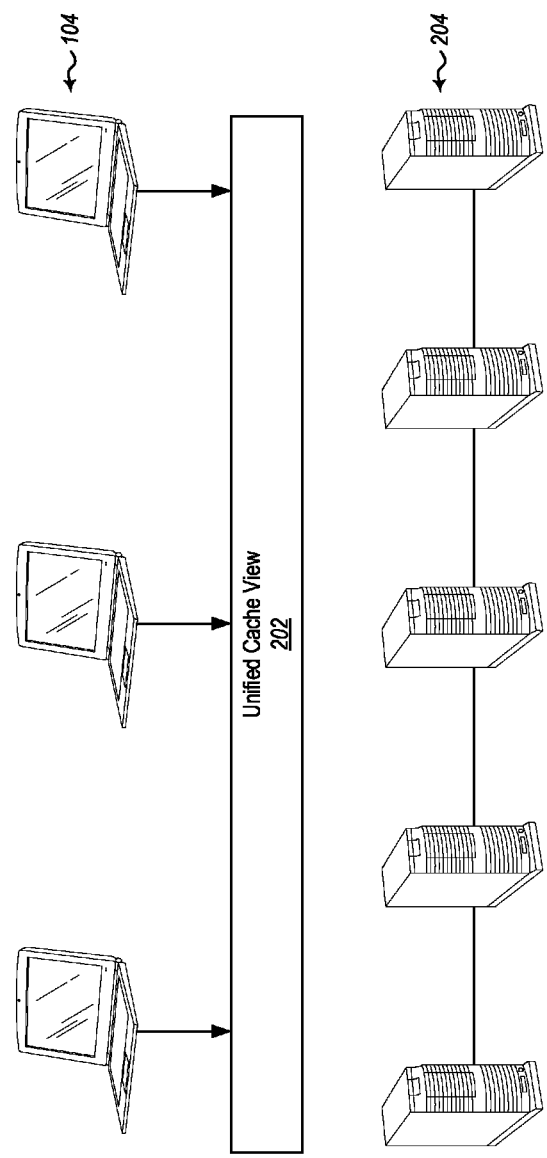
FIG. 2 illustrates a distributed cache.

Referring now to FIG. 2, an example of how the distributed cache 112 may be implemented is illustrated. The distributed cache 112 may be a distributed, in-memory cache. More specifically, the distributed cache 112 exposes a unified cache view 202 to the set 104 of servers by fusing together memory across cache servers 204. The distributed cache 112 architecture includes a ring of cache servers 204 running the distributed cache 112 service as well as client applications that utilize the distributed cache 112 client library to communicate with the unified cache view 202.

The distributed cache 112 enables a new cache tier that can enhance scalability, performance, and availability. More specifically, a high degree of scalability can be realized by minimizing the contention for database resources. More flexibility is instilled in this scalability as the architecture is freed from coupling servers 104 to specific server nodes, respective to state, and performance improvements can be enabled by bringing data closer to the logic that consumes it, thus improving response time and reducing latency. Through the distributed cache 112, high availability is achieved by insulating the cluster 102 with redundancy, therefore mitigating data loss as well as spikes in load on the data tier in the event of a node failure The distributed cache 112 may be configured as a partitioned cache. Partitioned caches distribute cache items across the hosts for particular named caches. Each overarching named cache can enable high availability, effectively causing the distributed cache 112 to maintain a configurable number of backups for items within a named cache across machines in the distributed cache 112 tier. In one embodiment, the distributed cache may be implemented using the Velocity™ distributed cache available from Microsoft Corporation of Redmond Wash.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
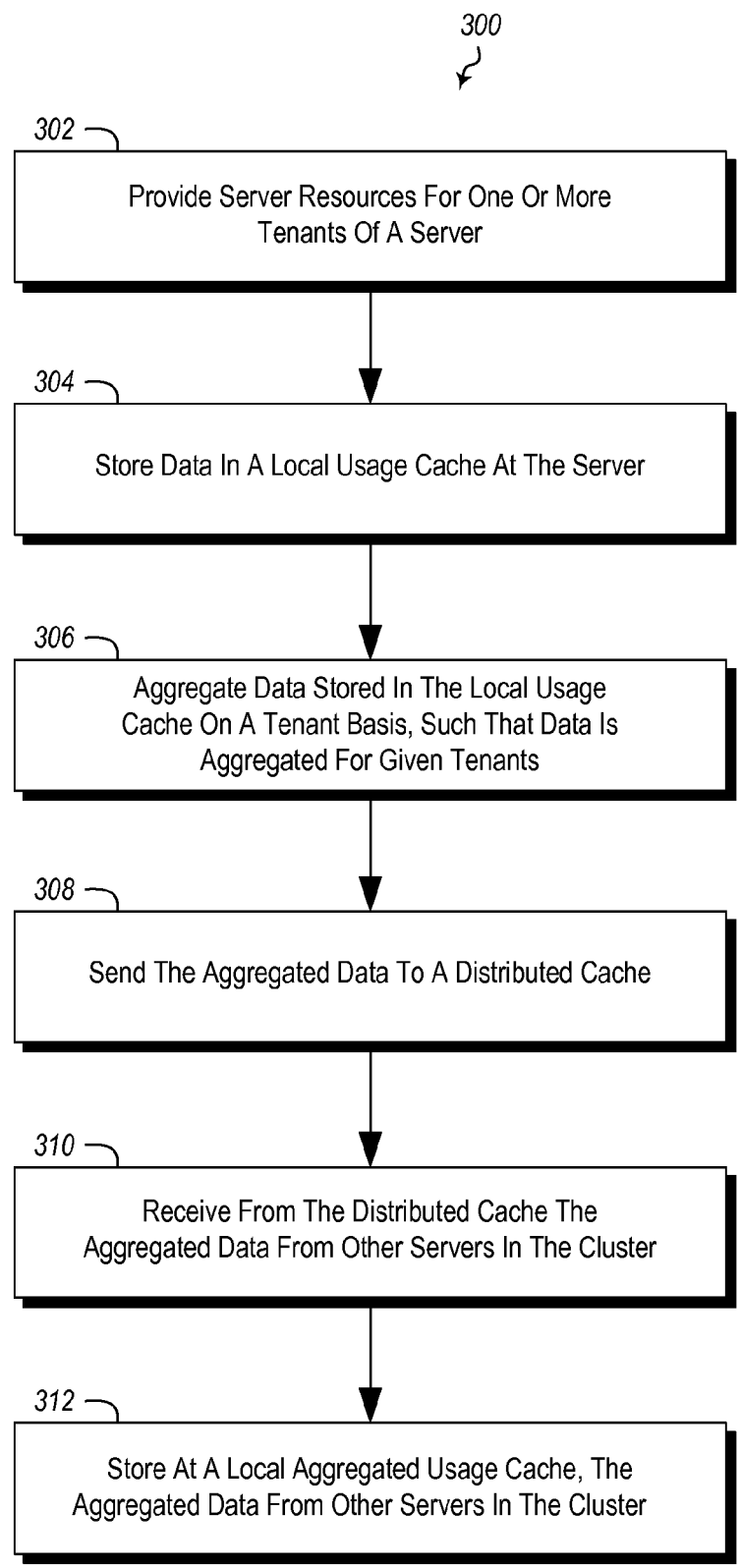
FIG. 3 illustrates a method of gathering tenant usage data in a cluster computing environment.

Referring now to FIG. 3, a method 300 is illustrated. The method 300 may be practiced in a computing environment, and includes acts for gathering tenant usage data of server resources. The method 300 includes a server in a cluster providing server resources for one or more tenants of the server (act 302). For example, FIG. 1 illustrates a server 104-1 that provides services to the set 106 of tenants. Such services may be hosting services, email services, content providing services, etc.

The method 300 further includes storing data in a local usage cache at the server (act 304). The data characterizes the resources provided to the one or more tenants of the server. For example, FIG. 1 illustrates a local usage cache 108-1 at the server 104-1 that stores usage data describing how resources are provided to the set 106 of tenants.

The method 300 further includes at the server, aggregating data stored in the local usage cache on a tenant basis, such that data is aggregated for given tenants (act 306). For example, at the server, the usage data may be aggregated to describe how each tenant uses resources at the server 104-1. For example, data may indicate that a given tenant has caused a certain amount of bandwidth to be used by the server 104-1, or that a certain amount of system memory has been used, or that a certain amount of processor time has been used, or that a certain number of emails have been sent and/or received, etc.

The method 300 further includes sending the aggregated data to a distributed cache (act 308). At the distributed cache the aggregated data may aggregated with aggregated data from other servers in the cluster to create globally aggregated data. For example, FIG. 1 illustrates that the servers in the set 104 of server send data 110 to the distributed cache 112. At the distributed cache, the data sent from the different servers can be aggregated. For example, the distributed cache 112 may aggregate data on a tenant basis such that a tenants usage of resources throughout the cluster 102 is recorded and aggregated together at the distributed cache 112. Alternatively, the distributed cache 112 may simply store aggregated data from the various servers in the cluster and make that aggregated data available to the various servers in the cluster. Thus, each server can pull data for other servers via the distributed cache and then globally aggregate the data to get a cluster-wide view of usage.

The method 300 further includes receiving from the distributed cache the aggregated data from other servers in the cluster (act 310). For example, the server 104-1 may receive the aggregated data for each of the tenants from the distributed cache 112.

The method 300 further includes storing at a local aggregated usage cache, the aggregated data from other servers in the cluster (act 312). For example, the server 104-1 may store the aggregated data of the various servers in the cluster in the aggregated usage cache 116-1. The data may be stored at the various servers, in some embodiments, as globally aggregated data.

The method 300 may be practiced where the distributed cache automatically sends the aggregated data, from other servers in the cluster, to the server. For example, the distributed cache 112 may automatically send the data 118 to the client 104-1. In some embodiments, this may be a user configurable function where a user can configure how often the data 118 is sent to the client 104-1.

In an alternative embodiment, the method 300 may further include the server pulling the aggregated data, from other servers in the cluster, from distributed cache for a particular set of tenants. For example the server 104-1 may request the data 118 from the distributed cache 112 in a pulling fashion. In some such embodiments, the server 104-1 may pull data for all tenants. In an alternative embodiment, the server pulls globally aggregated data for specific tenants, such as those that are using resources at the server 104-1.

The method 300 may further include throttling using the aggregated data from other servers in the cluster. For example, the server 104-1 may receive a request for resource usage by a tenant 106-1. The server 104-1 can consult the aggregated data for the various servers in the cluster in the aggregated usage cache and determine that the tenant 106-1 has exceeded a threshold for resource usage, and thus their usage of cluster resources may be throttled by a throttling module, such as by being denied or being provided in a reduced capacity, such as reduced bandwidth, processor operations, or other resource usage.

The method 300 may further include using the aggregated data from other servers in the cluster to generate analysis statistics. For example, rather than, or in addition to performing throttling functions, the aggregated data from the various servers in the cluster may be used by an analysis module to generate statistics about tenant usage of server/cluster resources across the entire cluster. Such statistics may be used for billing, service planning, or other functions.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of gathering tenant usage data of server resources, the method comprising:
   a server in a cluster providing server resources for one or more tenants of the server;
   storing data in a local usage cache at the server, the data characterizing the resources provided to the one or more tenants of the server;
   at the server, aggregating data stored in the local usage cache on a tenant basis, such that data is aggregated for given tenants;
   sending the aggregated data to a distributed cache;
   receiving from the distributed cache aggregated data from other servers in the cluster; and
   storing at a local aggregated usage cache, the aggregated data from other servers in the cluster as globally aggregated data.

2. The method of claim 1, wherein the distributed cache automatically sends the aggregated data from other servers in the cluster to the server.

3. The method of claim 1, further comprising the server pulling the aggregated data, from other servers in the cluster, from distributed cache for a particular set of tenants.

4. The method of claim 3, wherein the server pulls the aggregated data, from other servers in the cluster, for tenants using the server.

5. The method of 1 further comprising throttling using the aggregated data from other servers in the cluster.

6. The method of 1 further comprising using the aggregated data from other servers in the cluster to generate analysis statistics.

7. The method of claim 1, wherein receiving from the distributed cache the aggregated data from other servers in the cluster is performed according to a user configurable schedule.

8. One or more physical computer readable storage media comprising computer executable instructions that when executed by one or more processors cause one or more processors to perform the following:
   a server in a cluster providing server resources for one or more tenants of the server;
   storing data in a local usage cache at the server, the data characterizing the resources provided to the one or more tenants of the server;
   at the server, aggregating data stored in the local usage cache on a tenant basis, such that data is aggregated for given tenants;
   sending the aggregated data to a distributed cache;
   receiving from the distributed cache aggregated data from other servers in the cluster; and
   storing at a local aggregated usage cache, the aggregated data from other servers in the cluster as globally aggregated data.

9. The one or more computer readable media of claim 8, wherein the distributed cache automatically sends the aggregated data from other servers in the cluster to the server.

10. The one or more computer readable media of claim 8, further comprising the server pulling the aggregated data, from other servers in the cluster, from distributed cache for a particular set of tenants.

11. The one or more computer readable media of claim 10, wherein the server pulls the aggregated data, from other servers in the cluster, for tenants using the server.

12. The one or more computer readable media of claim 8 further comprising throttling using the aggregated data from other servers in the cluster.

13. The one or more computer readable media of claim 8 further comprising using the aggregated data from other servers in the cluster to generate analysis statistics.

14. The one or more computer readable media of claim 8, wherein receiving from the distributed cache the aggregated data from other servers in the cluster is performed according to a user configurable schedule.

15. A cluster system including functionality for gathering tenant usage data of server resources in the cluster system, the cluster system comprising:

a plurality of servers, the plurality of servers being configured to provide resources to tenants of the cluster system;

a plurality of local caches, with a local cache on each of the servers in the plurality of servers, each local cache storing usage information characterizing usage of resources on the server on which it is located for tenants using that server;

a distributed cache, the distributed cache storing usage information from all of the servers in the plurality of servers; and a plurality of aggregated caches, with an aggregated cache on each of the servers in the plurality of servers, each aggregated cache storing globally aggregated usage information for all servers and tenants of the cluster based on aggregated usage information for each of the servers in the plurality of servers sent from the distributed cache.

16. The cluster system of claim 15, further comprising an offline store configured to persist usage data separate from the servers and the distributed cache.

17. The cluster system of claim 15, further comprising a user interface configured to receive user input for defining a schedule of when data is sent from the distributed cache to the servers.

18. The cluster system of claim 15, further comprising one or more throttling modules at the servers configured to throttle cluster services for tenants based on the globally aggregated data.

19. The cluster system of claim 15, further comprising one or more analysis modules at the servers configured to generate analysis statistics for tenant usage of cluster resources.

20. The cluster system of claim 15, wherein the distributed cache is configured to globally aggregate usage information and send the globally aggregated usage information to the aggregated caches in the plurality of aggregated caches.

* * * * *